Aug. 5, 1952  R. H. McELROY  2,605,531
METHOD AND APPARATUS FOR WORKING CLAY
Filed Sept. 9, 1949  6 Sheets-Sheet 1

INVENTOR
ROY H. McELROY
BY
Toulmin & Toulmin
ATTORNEYS

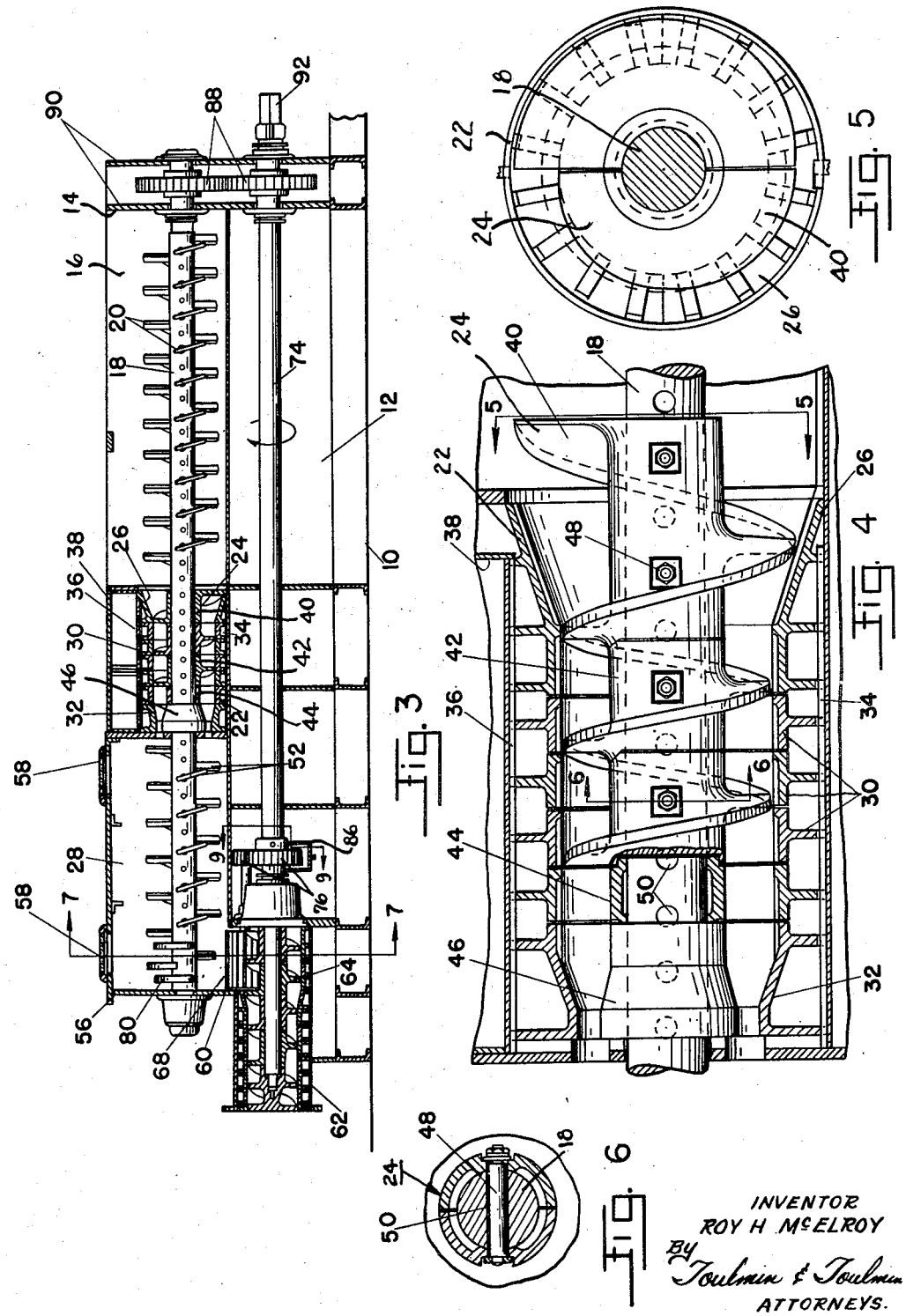

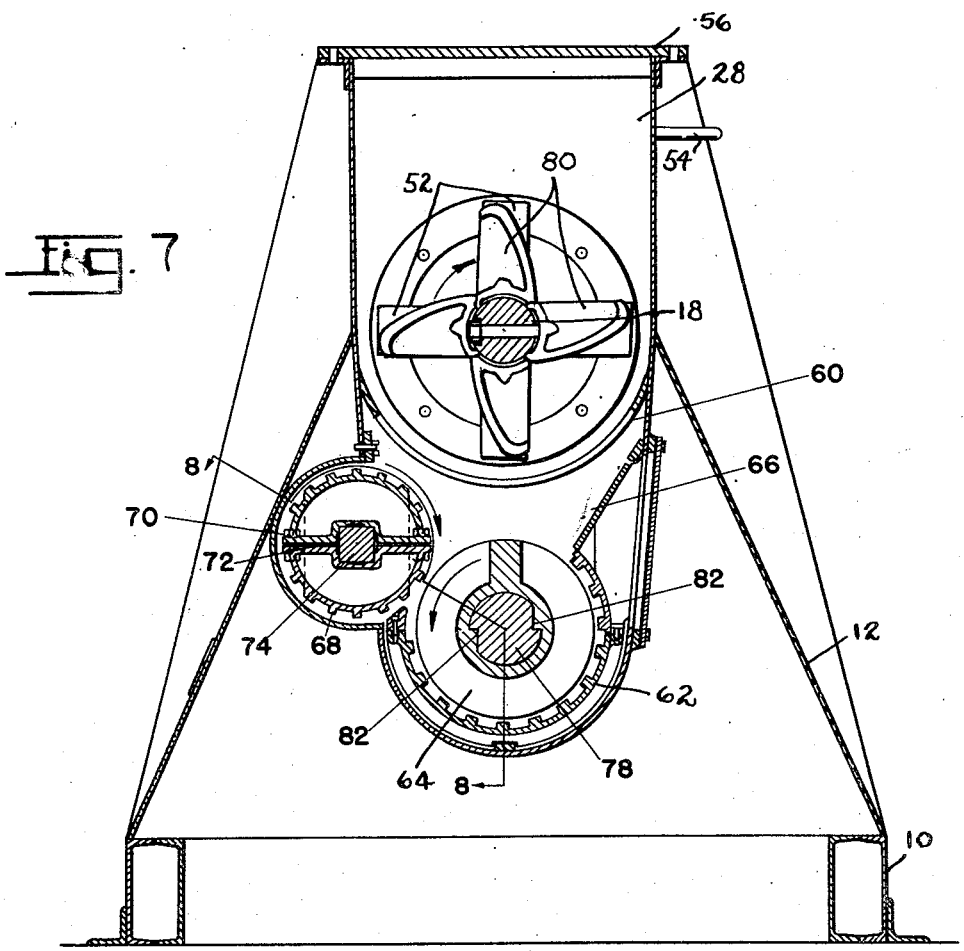

Aug. 5, 1952  R. H. McELROY  2,605,531
METHOD AND APPARATUS FOR WORKING CLAY
Filed Sept. 9, 1949  6 Sheets-Sheet 4

INVENTOR
ROY H. McELROY
By
Toulmin & Toulmin
ATTORNEYS

Aug. 5, 1952 R. H. McELROY 2,605,531
METHOD AND APPARATUS FOR WORKING CLAY
Filed Sept. 9, 1949 6 Sheets-Sheet 5
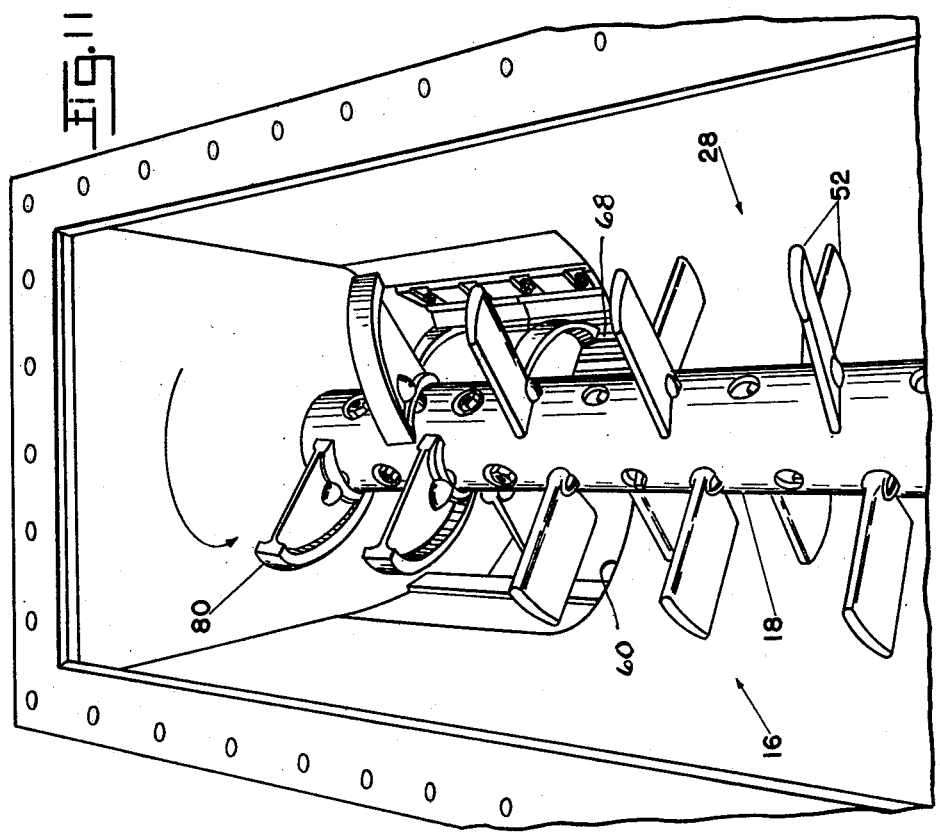
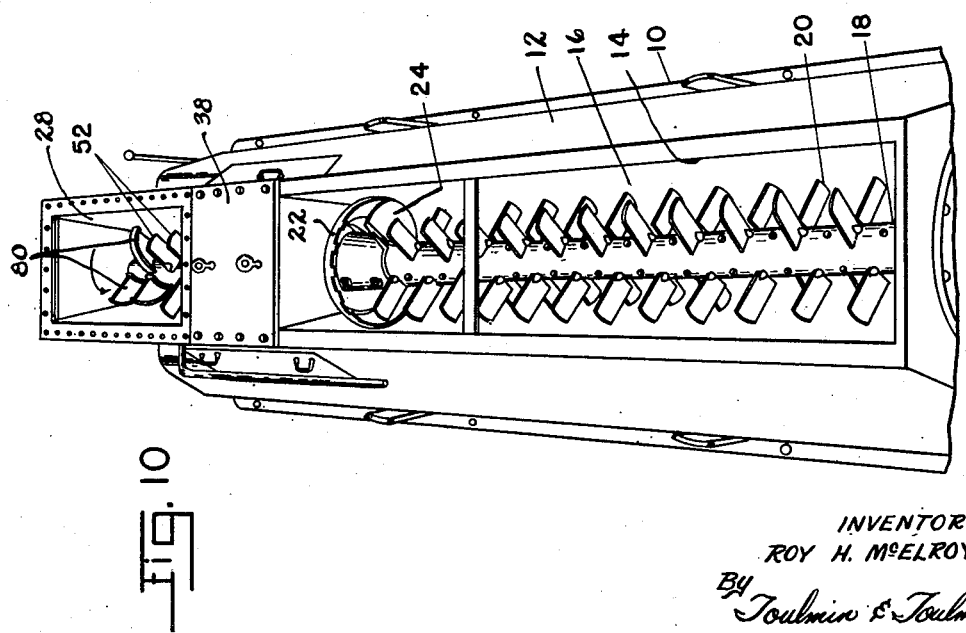
INVENTOR
ROY H. McELROY
By Toulmin & Toulmin
ATTORNEYS.

Aug. 5, 1952

R. H. McELROY 2,605,531

METHOD AND APPARATUS FOR WORKING CLAY

Filed Sept. 9, 1949

INVENTOR
ROY H. McELROY

By Toulmin & Toulmin
ATTORNEYS

Patented Aug. 5, 1952

2,605,531

UNITED STATES PATENT OFFICE 2,605,531

METHOD AND APPARATUS FOR WORKING CLAY

Roy H. McElroy, Dayton, Ohio, assignor to International Clay Machinery Co., Dayton, Ohio, a corporation of Ohio Application September 9, 1949, Serial No. 116,041

13 Claims. (Cl. 25—11)

This invention relates to a method and apparatus for the working of plastic materials such as clays to be used in the manufacture of bricks, tile, ceramic ware, and the like.

In the preparation of clays for the manufacture of brick and tile and similar articles, the clay must be finely comminuted and admixed and de-aired. All of these steps are highly important for the production of high quality products, and particularly the de-airing of the clay.

However, this last is an especially difficult step to carry out, because the clays are relatively stiff and viscous, and the entrained air does not readily escape therefrom, even when the clay is under a high vacuum. Many different arrangements have been tried for de-airing clays, but all have been lacking in some respects because, while it is essential to de-air the clay, it is also essential to maintain it in movement through the machine and to keep it free of voids. The problem, therefore, is not simply de-airing the clay, but accomplishing this in an economical manner and without interfering with the comminuting, advancing, and extrusion of the clay.

One of the particular objects of the present invention is to provide a method and apparatus effective for accomplishing a very complete de-airing of clays and the like which are being prepared for extrusion.

A still further object is the provision of a clay working machine including an elongated de-airing chamber, but which machine is very compact and occupies a minimum of floor space.

Another object is the provision of clay working machinery in which the material being worked is thoroughly admixed, de-aired, and which provides for a continuous and uninterrupted feed of the homogenized and air-free clay to the extrusion auger of the machine.

Normal clays will range from the alluvial type clays, which are rather sticky and require considerable power to comminute and advance through the machine, to the shale type of clays, which are somewhat harder than the alluvial type, but which are more easily worked and therefore require less power.

Another object of this invention is to provide a clay working machine which is adjustable for efficiently handling all types of clay so as to get efficient and thorough comminuting and de-airing thereof with the expenditure of a minimum amount of power.

Another object is the provision of a clay working machine having a de-airing chamber with an auger supplying the chamber and an auger discharging material from the chamber, in which the augers are so arranged as to be adjustable to maintain an effective seal at both sides of the chamber and to move material through the chamber but to maintain the power expenditure for the machine at a minimum.

A still further object of the present invention is the provision of a simplified external construction for a machine of the type described whereby the machine has a better appearance, is easier to keep clean, and can be fabricated by welding it up from plate.

Another object is to provide a frame arrangement for a machine of the type described in which the power unit for driving the machine is separate from the machine proper, thereby permitting considerable flexibility in the design and arrangement of the said power unit.

These and other objects and advantages will become more apparent upon reference to the following description taken in connection with the accompanying drawings in which:

Figure 3 is a longitudinal section through the clay working part of the machine, as indicated by line 3—3 on Figure 2;

Figure 4 is a somewhat enlarged view of the seal auger which feeds material in to the de-airing chamber and effects a seal at the inlet side of the said chamber;

Figure 5 is a view indicated by line 5—5 on Figure 4;

Figure 6 is a transverse section indicated by line 6—6 on Figure 4 and showing how the sections of the auger are retained in place on the drive shaft;

Figure 7 is a sectional view, indicated by line 7—7 on Figure 3, and showing the connection between the de-airing chamber and the extrusion chamber;

Figure 10 is a perspective view looking down on top of the machine from the right side of Figure 1, as indicated by the arrow 10 thereon, and with the cover plate of the de-airing chamber removed;

Figure 11 is a perspective view like Figure 10, but considerably enlarged thereover and showing the de-airing chamber somewhat more in detail;

Figure 1:
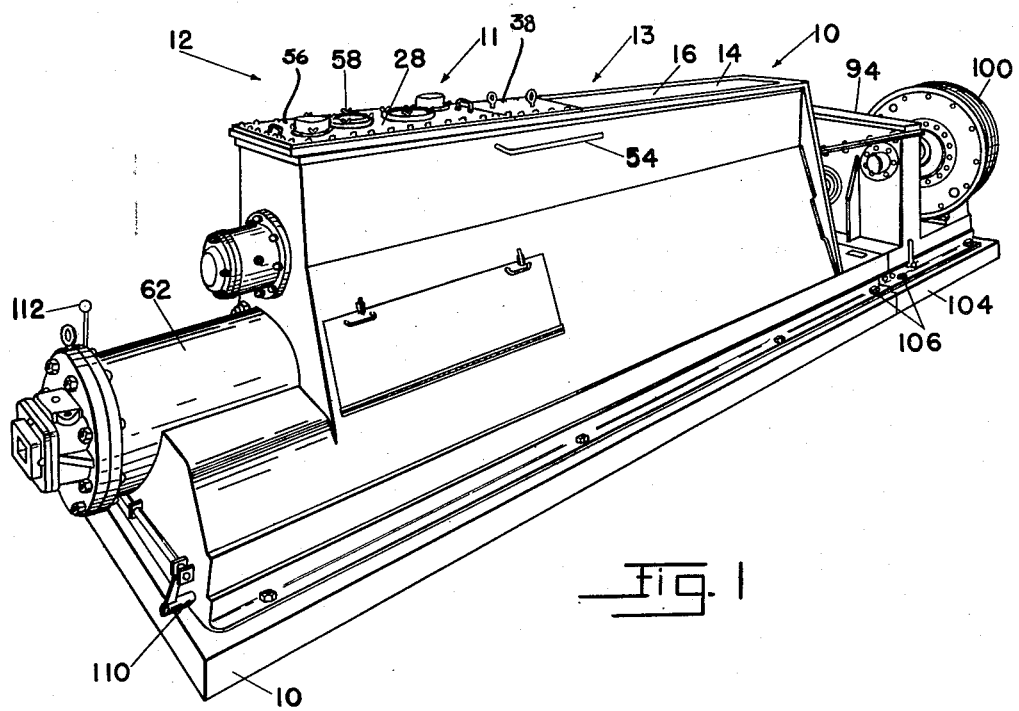
Figure 1 is a perspective view of a clay working machine constructed according to my invention.
Figure 13:
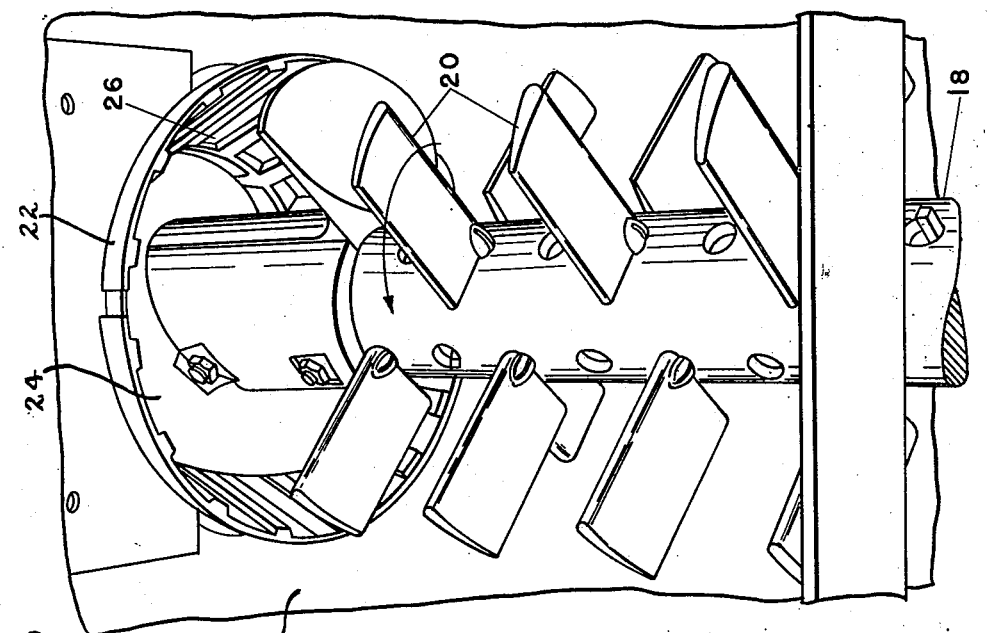
Figure 12:
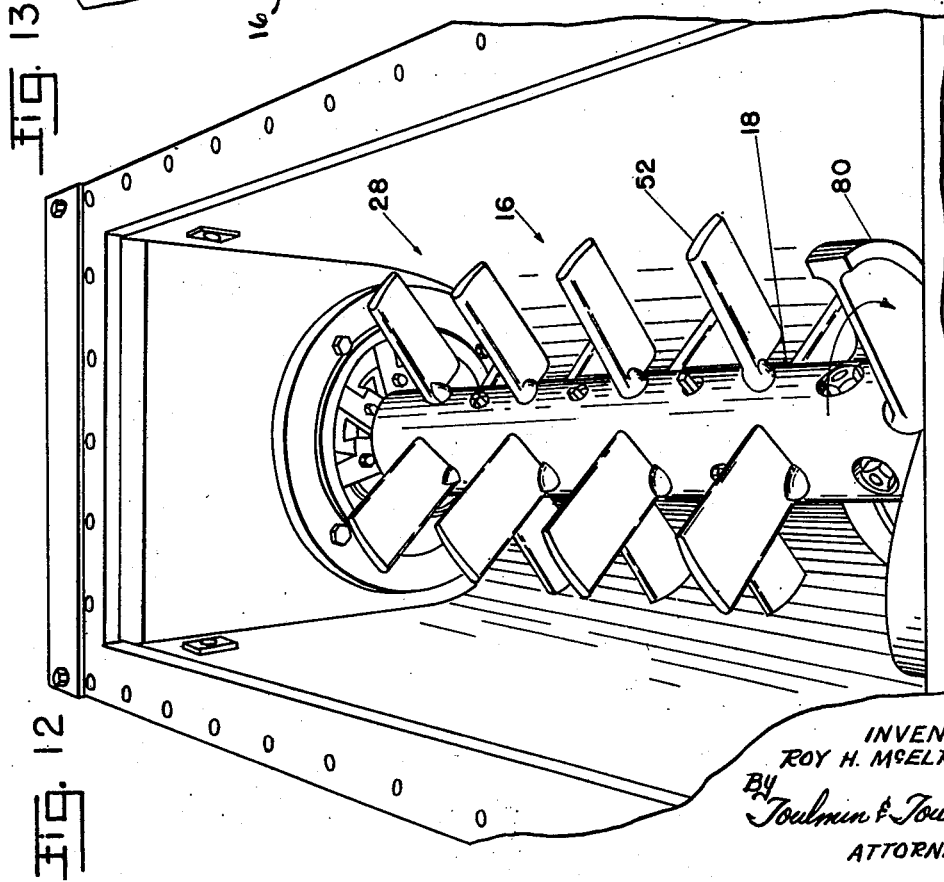

Figure 12 is a perspective view like Figure 11, but looking in the opposite direction, Figures 11 and 12 being indicated by arrows 11 and 12 on Figure 1; and Figure 13 is a perspective view like Figure 10, but considerably enlarged thereover and looking in at the inlet end of the chamber in which the seal auger runs. This figure is indicated by arrow 13 on Figure 1.

Referring to the drawings somewhat more in detail, the machine of my invention generally comprises base part 10, which may advantageously consist of a plurality of channel members suitably connected as by welding or by brackets, in order to provide an integral mounting platform for the machine frame. Supported on base 10 is the machine frame 12. Frame 12 preferably comprises plates welded together in the proper configuration so that a comparatively streamlined and smooth exterior of the machine results. This gives a frame which is pleasing in appearance and easy to clean, and which is sufficiently strong to support all loads placed thereon.

The upper part of frame 12 at the right end thereof is open, as at 14, to define a trough 16. Trough 16 is traversed by a shaft 18 having mounted thereon a plurality of knives or blades 20. These knives or blades, as will best be seen in Figure 13, have their leading edges somewhat sharp and are inclined in such a direction that when their supporting shaft 18 rotates, as indicated, material in trough 16 will move leftwardly. Trough 16, shaft 18, and blades 20 on the said shaft form a pugmill in which clay placed in the trough is comminuted and thoroughly admixed.

At its left end trough 16 communicates with a chamber 22, and mounted on shaft 18 within chamber 22 is an auger 24. The chamber 22 has a tapering inlet section 26 corresponding with the enlarged rear end part of auger 24. Auger 24 and chamber 22 provide means for receiving the comminuted and admixed clay from the left end of the pugmill and for forcing it into a de-airing chamber 28 into which the auger chamber opens at its left end.

The exact construction of the aforementioned auger and auger chamber is more fully illustrated in Figures 4, 5, and 6. In these views it will be observed that the auger chamber comprises a plurality of annular sections 30 between the inlet section 26 and the tapered outlet section 32 that forms the seal die. The annular sections are split in halves transversely of the chamber to permit assembly and disassembly of the said chamber without removing shaft 18.

The lower halves of these sections are held against circumferential movement by a key 34 securely fastened in the frame and extending into corresponding notches in the peripheries of the said chamber sections. Similarly, the upper halves of the annular sections also have a groove for receiving key 36 carried on the bottom of removable cover member 38.

By the construction described, the auger chamber is a continuous tube when assembled as shown in Figures 3 and 4, but can readily be removed from the machine either in part or in its entirety merely by lifting cover member 38 off the machine, which gives direct access to the auger chamber.

It will also be seen in Figures 4, 5, and 6 that the auger 24 is constructed of a plurality of sections, and each of the said sections is formed in halves so that the auger can be built up about the shaft 18 after the said shaft is in place in the machine. Similarly, the auger can be dismantled from the machine, should it become necessary, without removing shaft 18.

The auger sections include the tapered rear section 40, a plurality of intermediate sections 42, a spacer section 44, and a seal core section 46. At least the sections 42 and 40 are split, as shown in Figures 4 and 6, and are retained in position on shaft 18 and drivingly connected therewith by bolts 48. Bolts 48 extend through transverse bores 50 in shaft 18, and it will be observed that there are more of said transverse bores than there are bolts. The purpose of this is to provide means for adjusting the auger assembly axially on shaft 18 in order to accommodate it to different types of clays, so that the expenditure of power for forcing the clay through the auger chamber is kept at a minimum.

Thus, when a readily movable clay, such as a shale type of clay, is being handled, the auger can occupy the position shown in Figure 4. However, if a highly viscous alluvial type of clay is being handled, it would be preferable to move the auger rightwardly relative to the auger chamber, and possibly to remove one or more of the sections 42. The viscosity of the clay being handled would maintain a seal at the left end of the auger chamber but the amount of power expended in moving the clay through the auger chamber would be greatly diminished.

The clay is extruded from between the seal core 46 and the seal die into the de-airing chamber 28 and therein is acted on by a series of comminuting or pugging knives 52 similar to the knives 20 described in connection with the pugmill. Knives 52 finely comminute and admix the clay and advance it leftwardly through the de-airing chamber.

Figure 2:
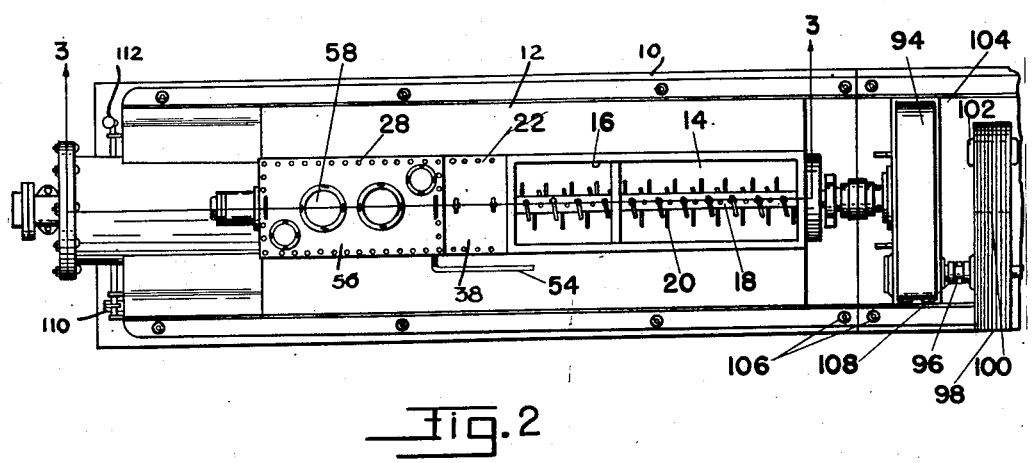
Figure 2 is a plan view looking down on top of Figure 1.
Figure 9:
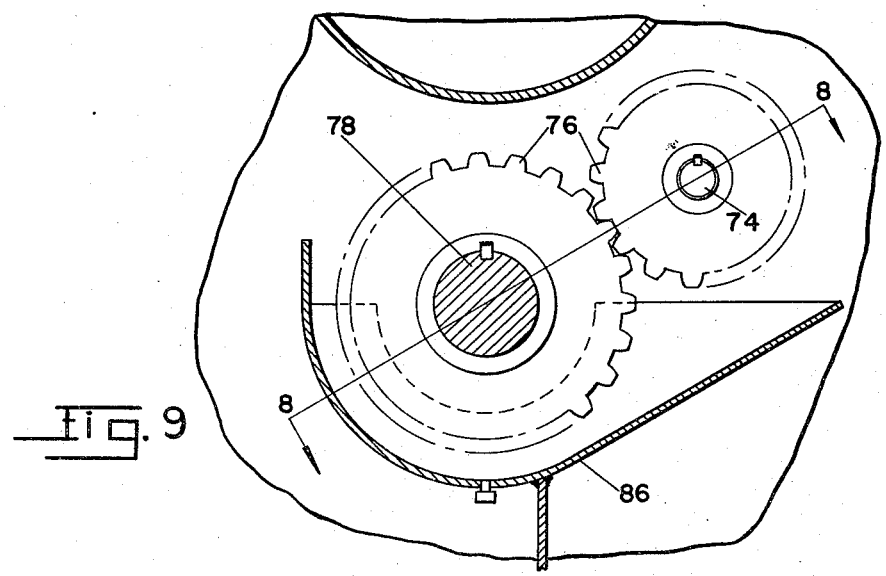
Figure 9 is a view, indicated by line 9—9 on Figure 8, and showing the drive connecting the extrusion auger with the feed means therefor.

The de-airing chamber is adapted for being highly evacuated by means of conduit 54 connected therewith, as shown in Figures 1 and 2, and on which a high vacuum is drawn by means of a vacuum pump mounted on the power unit of the machine.

The high vacuum existing in chamber 28 draws the air from the clay passing therethrough, and, as the clay is acted on by knives 52 to expose the air pockets entrained in the clay, more and more of the said air is removed. It will be observed that the de-airing chamber is relatively long, as contrasted with the typical short de-airing chamber of prior art machines, and because of this, a high degree of efficiency obtains in connection with the de-airing of the clay. In the usual manner, chamber 28 may have its cover 56 provided with sight glasses 58, through which the operation of the machine within said chamber can be observed.

At its left end de-airing chamber 28 has an opening in its bottom wall, as at 60, and this opening communicates with the inlet end of an extrusion chamber 62 having an extrusion auger 64.

Figure 8:
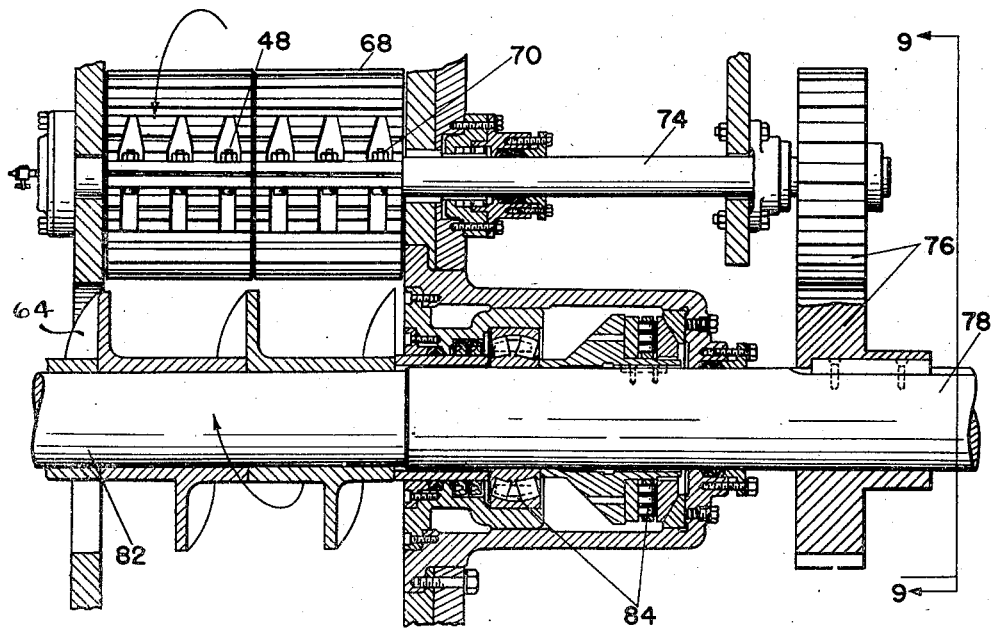
Figure 8 is a view indicated by line 8—8 on Figure 7 and showing the rear end of the extrusion auger, the thrust bearing therefor, and the arrangement for feeding de-aired homogenized clay to the extrusion auger.

Turning to Figures 7 and 8, it will be observed that opening 60 communicates with the inlet end of the auger chamber via a passage 66 which tapers inwardly toward the extrusion auger, and one wall of which is formed by the longitudinally ribbed rotary feed member 68. Feed member 68 is formed in halves which are bolted together by bolts 70 and is clamped about squared portion 72 on shaft 74.

Rotary feed chamber 68 and extrusion auger 64 are arranged to run together for forcing clay against the descending side of the extrusion auger by means of gears 76 connecting shaft 74 with auger shaft 78.

The clay which is delivered to the feed member 68 and extrusion auger 64 is discharged from the de-airing chamber through opening 60 therein by a plurality of feeder knives 80 mounted in shaft 18 immediately over the said opening 60. The provision of feeder knives 80 insures a continuous movement of clay downwardly through passage 66 to feed member 68 and auger 64 and assists in preventing inclusion of voids in the stream of clay which is finally discharged from the extrusion auger.

Turning now to the extrusion auger and the extrusion chamber, the extrusion chamber is preferably formed in sections similarly to the chamber 22 previously described, but the sections of the extrusion chamber can be made as annular rings to be inserted or removed from the left end of the part of the frame housing the extrusion chamber. Similarly, the extrusion auger 64 can be made of sections which can be mounted on or removed from shaft 78 from the left end thereof. Preferably, shaft 78 has driving notches 82 therein extending therealong, and the sections of the extrusion auger are so formed that they fit into the driving notches, whereby a positive driving connection between the auger sections and the driving shaft is had.

Due to the fact that the extrusion auger has a high axial thrust thereon, it is preferable that it be provided with both radial and thrust bearings, as at 84, capable of sustaining the said high thrusts without causing any great frictional loss. Due to the relative inaccessibility of gears 76, they may advantageously be maintained lubricated by means of a trough 86 mounted in the frame and into which one of the gears extends, and a suitable lubricant may be placed in the trough, thereby maintaining a proper supply to the said gears at all times.

Shafts 74 and 18 are also geared together, as by gears 88, arranged at the right end of trough 16 and between a pair of spaced partitions 90. Motive power for driving the machine is delivered to shaft 74 as through its squared end 92 from a speed reducing unit 94 which has an input shaft 96 mounting a pulley 98 that is connected by belts 100 with a motor pulley 102.

The speed reducer 94 and motor 102 are preferably mounted on a base part 104 that can be detachably connected to base 10 at the point of abutment of the said bases. Bolts 106 and connecting clips or brackets can advantageously be employed for this purpose. The separating of the machine and the power unit in the manner described permits the power unit to be removed from the machine for shipping, whereby the machine occupies substantially less space. Also, a machine can be supplied without a power unit should the purchaser desire to supply his own source of motive power.

There is preferably provided a clutch 108 on the power unit which is connected as by a rod 110 with a clutch operating lever 112 at the discharge end of the machine. In this manner the machine operator can turn the machine on and off without leaving his operating position adjacent the discharge end of the machine.

In operation, clay to be treated is placed in trough 16, and with the machine operating, this clay is comminuted and admixed and advanced leftwardly through trough 16 to auger 24 which picks it up and carries it through auger chamber 22 and forces it between the seal core and the seal die into the right end of de-airing chamber 28.

Within de-airing chamber 28, the clay is further comminuted and admixed and is simultaneously subjected to a high vacuum over a prolonged period, so that substantially all of the air entrained in the clay is removed therefrom.

As the clay approaches the left end of the de-airing chamber it is forced downwardly through opening 60 by feeder blades 80. The clay which is forced downwardly through opening 60 passes into channel 66 and then is forced by rotary feed member 68 against the descending side of extrusion auger 64. In accomplishing this last-mentioned feeding movement, the clay is kneaded and compressed, thereby eliminating voids from the stream of clay and assuring that the extrusion auger and extrusion chamber will be completely filled with clay at all times.

The clay which is delivered to the extrusion auger is carried thereby leftwardly within the extrusion chamber toward the discharge end thereof and is then forced through any suitable extrusion die mounted on the said left end of the extrusion chamber. The clay so extruded is thoroughly homogenized and de-aired so that subsequently, when the clay is fired to produce the finished article, said finished article is of high quality, free of voids, laminations, air holes and fissures.

As has been explained, different viscosities of clay can readily be accommodated by varying the axial length of the seal and extrusion augers and chambers, and the relative positioning of the seal auger and chamber.

In all cases the clay being worked is subjected to prolonged de-airing and a plurality of serially arranged force feeding means, as exemplified by the feeder blades 80, the rotary feeder member 68, and the extrusion auger 64, thereby insuring a continuous and void free supply of clay to the extrusion die at all times.

One of the features of this invention is to be found in the arrangement wherein the clays are pugged for a prolonged period including one stage where the pugging is not accomplished by de-airing and another stage where the pugging is accomplished by de-airing, the clay moving continuously during the said pugging.

The arrangement referred to above has been found to be of particular advantage with shales and fire clays in that the prolonged pugging leads to very fine grains of material and the prolonged de-airing under high vacuum removes substantially all of the air from the clay and also assists in breaking it up into a fine granular state.

It will be understood that this invention is susceptible to modification in order to adapt it to different usages and conditions, and, accordingly, it is desired to comprehend such modifications within this invention as may fall within the scope of the appended claims.

I claim:

1. In a clay working machine; a pugmill, a shaft extending through said pugmill and having knives arranged thereon for comminuting the clay introduced therein, an extrusion press communicating with said pugmill and comprising an extrusion chamber having an auger rotatably mounted therein, an opening at the top of said extrusion chamber at the rear end thereof, and a cylindrical rotary feed member arranged above and to one side of said opening and communicating with said extrusion chamber for forcing clay into said chamber against the descending side of said auger, said auger and rotary feed member being enclosed and said feed member being adapted to receive clay advanced thereto from the pugmill.

2. In a clay working machine; a pugmill and a de-airing chamber associated therewith, an extrusion press comprising an extrusion chamber and an auger rotatable therein, said extrusion chamber having an opening at its top adjacent the rear end, and a cylindrical rotary feed member mounted on an axis parallel to the axis of said auger and positioned to one side of said opening and above said auger for forcing clay against the descending side of said auger, the said rotary feed member having longitudinally extending ribs on its outer working surface.

3. In a clay working machine comprising a pugmill and a de-airing chamber associated therewith, an extrusion chamber having an extrusion auger rotatably mounted therein, an opening in the top of said extrusion chamber adjacent the rear end of said auger, a cylindrical feed member extending along one side of said auger and at a higher level than said auger and communicating with said opening and rotatable on an axis parallel to the axis of the auger, said feed member being operatively connected to said auger and rotated in a direction opposite to that of the auger for forcing clay against the descending side of said auger, and means for drivingly connecting said auger and feed member.

4. In a clay working machine comprising a pugmill; a de-airing chamber communicating with said pugmill and under vacuum for de-airing clay, and an extrusion press in communication with said de-airing chamber for extruding the de-aired clay, said extrusion press having an auger arranged therein, passage means connecting said chambers, means in said de-airing chamber for comminuting clay therein and for advancing it therethrough toward said passage and including means for forcing the de-aired clay into said passage, and rotary means in said passage above and to one side of said extrusion chamber, said rotary means being operatively connected with said auger and rotated in a direction opposite to that of said auger for forcing the clay against the descending side of said extrusion auger.

5. In a clay working machine comprising a pugmill; a de-airing chamber adapted for being evacuated, an extrusion chamber having an auger therein, a passage connecting the rear end of said extrusion chamber with said de-airing chamber; means for comminuting clay in said de-airing chamber and for forcing it therethrough and into said passage, a cylindrical rotary feed member mounted in said passage above and to one side of said auger, said feed member having a corrugated working surface which upon rotation of said feed member is operable for forcing clay from said passage against the side of said auger, and means for driving said feed member and auger, said auger and feed member being rotated in opposite directions and said feed member rotating at a greater rotational speed than said auger.

6. In a clay working machine including a pugmill; a horizontally extending extrusion chamber in communication with said pugmill and having an opening at the top at its rear end, a horizontally extending de-airing chamber having an opening in its bottom at the front end positioned over the said opening in the extrusion chamber, a passage connecting said openings and tapering toward said extrusion chamber, a cylindrical feed member at one side of said passage being partly in said passage and partly in said extrusion chamber, said feed member being rotatable and adapted to knead and compress clay passing from said de-airing chamber, an auger in said extrusion chamber, and means connecting said auger and feed member so that they rotate together and thereby feed clay against the descending side of said auger, said feed chamber being rotated at a higher rotational speed than said auger.

7. In a seal press adapted for being placed between a pugmill and a de-airing chamber in a clay working machine; an auger and an auger chamber, said auger and chamber being straight for the greater part of their length and being conically formed at their pugmill end to flare outward toward the pugmill, a shaft supporting said auger, and means for adjusting said auger along said shaft to vary the spacing between its conical end and the conical end of said chamber, thereby to vary the power required for driving said shaft for different types of clays, and means for positively connecting the auger with the shaft in any of its adjusted positions therealong.

8. In a clay working machine; a frame, a pugmill in said frame, a shaft extending through said pugmill and having knives thereon for comminuting the clay in the mill for advancing it toward one end thereof, a recess in said frame at the said one end of the mill and a box-like cover receivable in said recess to define a housing, said shaft extending through said housing, and a seal press receivable in said housing comprising a split auger secured to said shaft and a split cylinder surrounding said auger.

9. In a clay working machine; a frame, a pugmill in said frame, a shaft extending through said pugmill and having knives thereon for comminuting the clay in the mill for advancing it toward one end thereof, a recess in said frame at the said one end of the mill and a box-like cover receivable in said recess to define a housing, said shaft extending through said housing, a seal press receivable in said housing comprising a split auger secured to said shaft and a split cylinder surrounding said auger, and means in said recess for retaining said split cylinder therein against rotation.

10. In a clay working machine; a frame, a pugmill in said frame, a shaft extending through said pugmill and having knives thereon for comminuting the clay in the mill and for advancing it toward one end thereof, a recess in said frame at the said one end of the mill and a box-like cover receivable in said recess to define a housing, said shaft extending through said housing, a seal press receivable in said housing comprising a split auger secured to said shaft and a split cylinder surrounding said auger, said cylinder comprising upper and lower halves, said halves being longitudinally slotted, and key members in the bottom of said recess and on the bottom of said cover member engaging said slots to retain said cylinder against rotation.

11. A machine for working clay to produce a thoroughly homogenized and de-aired clay mass which comprises an elongated pugmill, a de-airing chamber in communication with said pugmill and forming a continuation thereof, an auger chamber disposed between said pugmill and said de-airing chamber, an auger in said chamber which receives clay from said pugmill and forms a seal between said pugmill and said de-airing chamber, an extrusion auger arranged adjacent to and in communication with said de-airing chamber, and a rotary feed chamber in said de-airing chamber and coacting with said extrusion auger and adapted to feed clay from said de-airing chamber to said extrusion auger, said rotary feed member being driven at a rotational speed to cause kneading and pressing of said clay as the same is delivered to said extrusion auger to form a clay mass which is free from laminations and of uniform smooth texture.

12. A method of working clay to produce a thoroughly homogenized and de-gased clay mass of uniform consistency which comprises the steps of continuously comminuting and mixing clay particles, moving said particles therealong while subjecting the same to a vacuum treatment to remove entrained gases, thereafter subjecting said de-gased clay to a kneading and pressing treatment, and then extruding the de-gased and kneaded clay.

13. A method of working clay to produce a thoroughly homogenized and de-aired clay mass which includes the steps of comminuting and pugging the clay particles, subjecting the same to vacuum treatment while comminuting and mixing the clay mass to remove entrained air and extruding the same while in a de-aired condition, the improvement which comprises kneading and pressing said clay particles subsequent to said comminuting and mixing treatment under vacuum conditions and while continuing said vacuum treatment and concurrently with said extrusion of the de-aired and kneaded clay mass.

ROY H. McELROY.

REFERENCES CITED

The following references are of record in the file of this patent:

UNITED STATES PATENTS

| Number | Name | Date |
|---|---|---|
| 68,101 | Mills | Aug. 27, 1867 |
| 707,831 | Cunningham | Aug. 26, 1902 |
| 1,101,142 | Mueller | June 23, 1914 |
| 1,627,576 | Royle | May 10, 1927 |
| 1,809,983 | Lodge | June 16, 1931 |
| 1,904,884 | Royle | Apr. 18, 1933 |
| 1,912,374 | Johnson | June 6, 1933 |
| 1,987,358 | Bonnot | Jan. 8, 1935 |
| 1,987,359 | Brown | Jan. 8, 1935 |
| 2,078,565 | Durst et al. | Apr. 27, 1937 |
| 2,096,362 | Lehman | Oct. 19, 1937 |
| 2,276,261 | Buzard | Mar. 10, 1942 |
| 2,411,971 | MacMillin et al. | Dec. 3, 1946 |
| 2,441,222 | Fuller | May 11, 1948 |
| 2,458,068 | Fuller | Jan. 4, 1949 |

FOREIGN PATENTS

| Number | Country | Date |
|---|---|---|
| 435,210 | Great Britain | Sept. 17, 1935 |
| 18,219 | Sweden | Dec. 17, 1902 |